United States Patent [19]
Buono

[11] Patent Number: 5,823,490
[45] Date of Patent: Oct. 20, 1998

[54] BARBECUE SUPPORT AND STORAGE FRAME SYSTEM

[75] Inventor: Steven A. Buono, Greeneville, Tenn.

[73] Assignee: MECO Corporation, Greeneville, Tenn.

[21] Appl. No.: 678,491

[22] Filed: Jun. 12, 1996

Related U.S. Application Data

[60] Provisional application No. 60/005,434, Oct. 13, 1995.

[51] Int. Cl.⁶ .................................................. A47J 37/00
[52] U.S. Cl. ............................................ 248/129; 126/30
[58] Field of Search ................................... 248/127, 129, 248/163.1; 126/25 R, 30, 41 R, 40

[56] References Cited

U.S. PATENT DOCUMENTS

| | | | |
|---|---|---|---|
| 2,950,925 | 8/1960 | Larson ................................ | 248/129 X |
| 3,373,731 | 3/1968 | Shook ..................................... | 216/30 |
| 3,603,542 | 9/1971 | Grille ................................... | 248/129 X |
| 3,630,188 | 12/1971 | Ross ..................................... | 126/25 R |
| 3,641,922 | 2/1972 | Nachazel et al. ..................... | 126/30 X |
| 4,090,490 | 5/1978 | Riley et al. ......................... | 248/129 X |
| 4,117,825 | 10/1978 | Robertson ............................. | 126/29 |
| 4,548,193 | 10/1985 | Marogil ................................ | 126/30 |
| 4,796,599 | 1/1989 | Cooper ................................. | 126/30 |
| 4,836,480 | 6/1989 | Besner ................................. | 248/125 |
| 4,932,391 | 6/1990 | Bierdeman ............................. | 126/30 |
| 4,984,515 | 1/1991 | Pivonka ............................... | 248/129 X |
| 4,989,580 | 2/1991 | Dunham ................................ | 126/41 |
| 5,027,788 | 7/1991 | Schlosser et al. .................... | 126/30 X |
| 5,033,448 | 7/1991 | Sandweg .............................. | 126/30 X |
| 5,140,973 | 8/1992 | Home .................................. | 248/129 X |
| 5,307,789 | 5/1994 | Newby ................................. | 126/30 X |
| 5,333,540 | 8/1994 | Mazzocchi ......................... | 126/25 R X |
| 5,626,126 | 5/1997 | McNulty .............................. | 126/30 X |

*Primary Examiner*—Peter M. Cuomo
*Assistant Examiner*—Robert J. Sandy
*Attorney, Agent, or Firm*—Roberts & Brownell, LLC

[57] ABSTRACT

An apparatus for a barbecue support and storage frame system that provides support, mobility, and storage for a barbecue grill. The apparatus includes two c-shaped elements that are equally spaced from one another. The c-shaped elements have upper legs and lower legs. Mounted to the upper supports is the barbecue grill. Attached to the lower legs are wheels and extensions. The wheels allow the user to easily maneuver the barbecue to any desired location whereas the extensions prevent the barbecue from moving when in use. Also attached to the lower legs are shelves. The lower legs are positioned so that they and the shelves do not interfere with the items—food and barbecue accessories—that are placed on the shelves. Shelves are also hinged to the upper legs of the c-shaped elements. At least one handle is placed on the barbecue grill or frame so that the user may maneuver the system in any desired direction The frame is built of sturdy lightweight material which can withstand the environmental elements as well as external loads that are placed upon it The frame is easily assembled, disassembled, and maintained.

26 Claims, 4 Drawing Sheets

BARBECUE SUPPORT AND STORAGE FRAME SYSTEM

RELATED APPLICATION DATA

The present disclosure is a non-provisional application related to the provisional U.S. Pat. application entitled "A Barbecue Support and Storage Frame System", Ser. No. 60/005,434, filed Oct. 13, 1995.

FIELD OF THE INVENTION

The present invention relates generally to supports for barbecue grills. In particular, the present invention relates to frames that provide support, mobility, and storage for a barbecue grill.

BACKGROUND AND DESCRIPTION OF RELATED ART

Barbecues and their accompanying barbecue support frames have long been used in backyard settings picnics, cookouts, family gatherings, and a host of other social gatherings to the enjoyment of millions. These social gatherings have provided many fond memories of summers past and welcomed expectations of future outings. These memories also most assuredly include hours standing by the barbecue in anticipation of a home cooked barbecue meal as well as the frustrations associated with the use of current barbecue systems. To this end, many current barbecue support frames pose inconveniences to the users, including poor access to storage space and difficulty in assembling, maintaining, storing, and transporting the barbecue system. In light of these failings, barbecue manufacturers have attempted to design several support frames to overcome these shortcomings.

Over the past years barbecue manufacturers have designed several frames. These frames are usually constructed from metal tubes or poles and usually feature legs for support. These frames are available in many styles, from monopole designs to four-legged designs. Specifically, monopole designs, which have been known in the art for several decades, are based on a single pole which branches from the underside of the barbecue grill. On the bottom end of the pole is typically a three-legged or four-legged stand that allows the barbecue to rest on the aground. These systems typically do not have means for transporting the barbecue or, equally as important, do not provide adequate storage space for food, utensils, charcoal, etc. To transport these barbecue systems the user must lift the entire barbecue assembly to the desired location before beginning to barbecue. Further, when using the monopole design, the user must have a table nearby to store barbecue accessories and food that is to be prepared. Additionally, these monopole barbecue systems are not very stable or durable.

A specific example of a monopole barbecue system is U.S. Pat. No. 4,932,391 to Bierdemann wherein a grill device having a base, a support post, and a cantilever arm is disclosed. A first connection means connects the base to the support post, whereas a second connection means fastens the cantilever arm to the support post. A grill body is displaced on the cantilever arm by a third connecting means. The base is basically a U-shaped member with a stability portion at the open ends of the U-shaped portions. All connection means provide a mechanism for adjustment.

Additionally, U.S. Pat. No. 4,836,480 to Besner also discloses a monopole design. Basically a support frame comprises a support base and a support rod connected thereto. The support frame is a rectangular shaped member having a slip sleeve at one end. The support rod extends vertically from the slip sleeve of the base unit. At the distal end of the support rod is a support arm extending vertically upward, and thereafter, at a right angle. The support arm, at the vertical portion, telescopes through the support base and is fixed by a hole and pin assembly therethrough. At the right angle of the support arm is a hooking mechanism that is facing in the opposite direction of the right angled support arm and base unit. At the opposite side of the support arm is a hollow center. The hooks, in conjunction with the hollow center, enable the cooking grill to be mounted on the frame structure.

An example of a bi-polar design is U.S. Pat. No. 4,796,599 to Cooper which discloses a portable cooking grill formed from two vertical posts removably attached to upturned ends of a U-shaped base. Circumferentially placed about the vertical posts at different levels are horizontal ribs. Placed on the ribs are diagonal braces that are attached to a grill. The braces, used in conjunction with the ribs, allow the cooking grill to be mounted at various height levels. There are no wheels, extensions, or cantilever shaped legs disclosed in this invention.

Other bi-polar designs include U.S. Pat. No. 4,548,193 to Marogil (the "'193 patent") and U.S. Pat. No. 3,630,188 to Ross (the "'188 patent"). The '193 patent discloses a multi-purpose portable outdoor cooking stand having a support frame, a grill cooking surface, a pan for holding food, and a vented cover for release of smoke, wherein the support frame comprises parallel longitudinal foot members and vertical mounting posts forming an L-shaped support frame. The '188 patent discloses a charcoal cooking grill comprising an elongated trough for receiving charcoal, wherein a grill assembly comprises a plurality of U-shaped members extending over the top of the trough. Secured to the trough are two legs having a generally inclined vertical portion and horizontally dogleg portions.

U.S. Pat. No. 4,117,825 to Robertson discloses a cooking stand having a substantially L-shaped support member having vertical legs and horizontal forward and rearward extending feet. The rearward feet are shorter than the forward feet and used for added stability. Disposed between the legs are four parallel retaining bars, two disposed on the front side and two disposed on the rear side in an alternating fashion.

In contrast four-legged barbecue designs are usually very complicated and time consuming to erect. To this end, the four-legged systems are usually accompanied by very lengthy instructions, making it impractical to disassemble and reassemble the system. These systems are also very heavy and cumbersome making them difficult to transport on a regular basis. Some designs include wheels on at least some of the legs, but these barbecues are still heavy and cumbersome to push.

A further example of current barbecue systems is disclosed in U.S. Pat. No. 4,989,580 to Dunham which shows a dual grill cooking apparatus supported by a frame having a supply of combustion gases and an induced draft exhaust system. In particular the cooking apparatus has an upper and lower grill whereby gas is supplied through hollow tubes for the cooking of foods. The tubes have an intake manifold and an exhaust duct. The upper grill is pivotally connected to the frame. The frame system comprises hollow members that are defined as exhaust ducts. The frame is generally L-shaped with the barbecue grill attached to the upper member of the vertical portion of the L-shaped frame. No shelves or a detailed analysis of the shape of the frame is disclosed in this patent. The frame is not designed for stability support, or the placement of shelves for unencumbered storage space.

Another shortcoming of the four-legged systems are that they customarily have no food storage or barbecue accessory space. When storage space is available, it is usually difficult to access and does not allow large items to be stored thereon. This is due to the fact that conventional designs interfere with the storage of items on the accompanying shelves.

Thus, current designs have not addressed the problems the average barbecue users encounter, i.e., added access to storage space, maneuverability durability, and easy maintenance and assembly. At the present time, there are no known systems which address all these user needs simultaneously.

What is needed to overcome the shortcomings of existing barbecue frames is a durable support and storage frame that allows for easy assembly, maintenance, and transportation, and provides added access to storage space. Such a system would include a barbecue grill placed on top of a support frame that is strong, durable, and easy to use. The frame itself should have an open storage area that is easily accessible and that can store numerous large items. Preferably the design should include wheels for easy portability and a handle for ease in maneuvering

SUMMARY OF THE INVENTION

It is therefore an object of the present invention to provide a free-standing barbecue support and storage frame system.

It is a further object of the present invention to provide a barbecue support and storage frame system that is easy to transport.

It is still a further object of the present invention to provide a barbecue support and storage frame system that has a large and easily accessible storage space.

It is yet a further object of the present invention to provide a barbecue support and storage frame system that is strong and sturdy.

It is another object of the present invention to provide a barbecue support and storage frame system that offers the above objects and is stable.

These and other objects and advantages of the present invention will be apparent to those of ordinary skill in the art upon inspection of the detailed description, drawings, and appended claims.

The barbecue frame of the present invention is contemplated for use in the support of barbecue grills and storage of items such as food and barbecue accessories.

The barbecue frame includes a support frame combined with a plurality of wheels, shelves and at least one handle. The support frame supports the barbecue grill unit, which may include the grill housing and accompanying barbecue controls. The barbecue support frame may be constructed of lightweight but strong material designed to withstand external forces that may be applied when food or accessories are stored thereon, or from other barbecue use. The support frame further may be designed to withstand environmental elements, such as wind and rain. The design of the frame also allows convenient transportation as well as preservation of barbecue grill integrity during usage and transportation, and preferably can be erected on site.

The barbecue support frame comprises cantilever shaped elements wherein one end of each cantilever shape portion is mounted to the barbecue grill and another end is connected to a plurality of wheels or extensions. A multitude of shelving systems may be attached to the sides of the barbecue. The cantilever shaped portions may be separated from each other at a certain distance by the barbecue grill or shelving system.

The support frame is further designed so that the weight of the barbecue grill is displaced over the entire support frame structure thus creating a stable integrated unit. The plurality of wheels on the frame, in conjunction with the placement of the barbecue grill, allows for easy transport. The support frame is further designed so that the frame will not move without the barbecue user's initiation.

This system comprises but a few parts and is therefore easily assembled. As such, this system is very versatile so as to support an array of items and perform its barbecuing functions at the same time Due to the barbecue's configuration it is easy to transport and is suitable for use in a number of locations.

DETAILED DESCRIPTION OF THE INVENTION

The present invention is a free standing barbecue support and storage frame system ("BSSFS") used to support barbecue grills. The dimensions of the BSSFS, including legs, wheels, shelves, handles, connectors, and other dimensions and quantities specified herein may vary with the size and type of barbecue grill contemplated for use. The BSSFS will cooperate with any shape barbecue grill (e g. kettle, rectangular, square, etc.). Therefore, numbers and dimensions specified herein are not to be construed as limitations on the scope of the present invention but are meant to be merely illustrative of one particular application.

Figure 1:
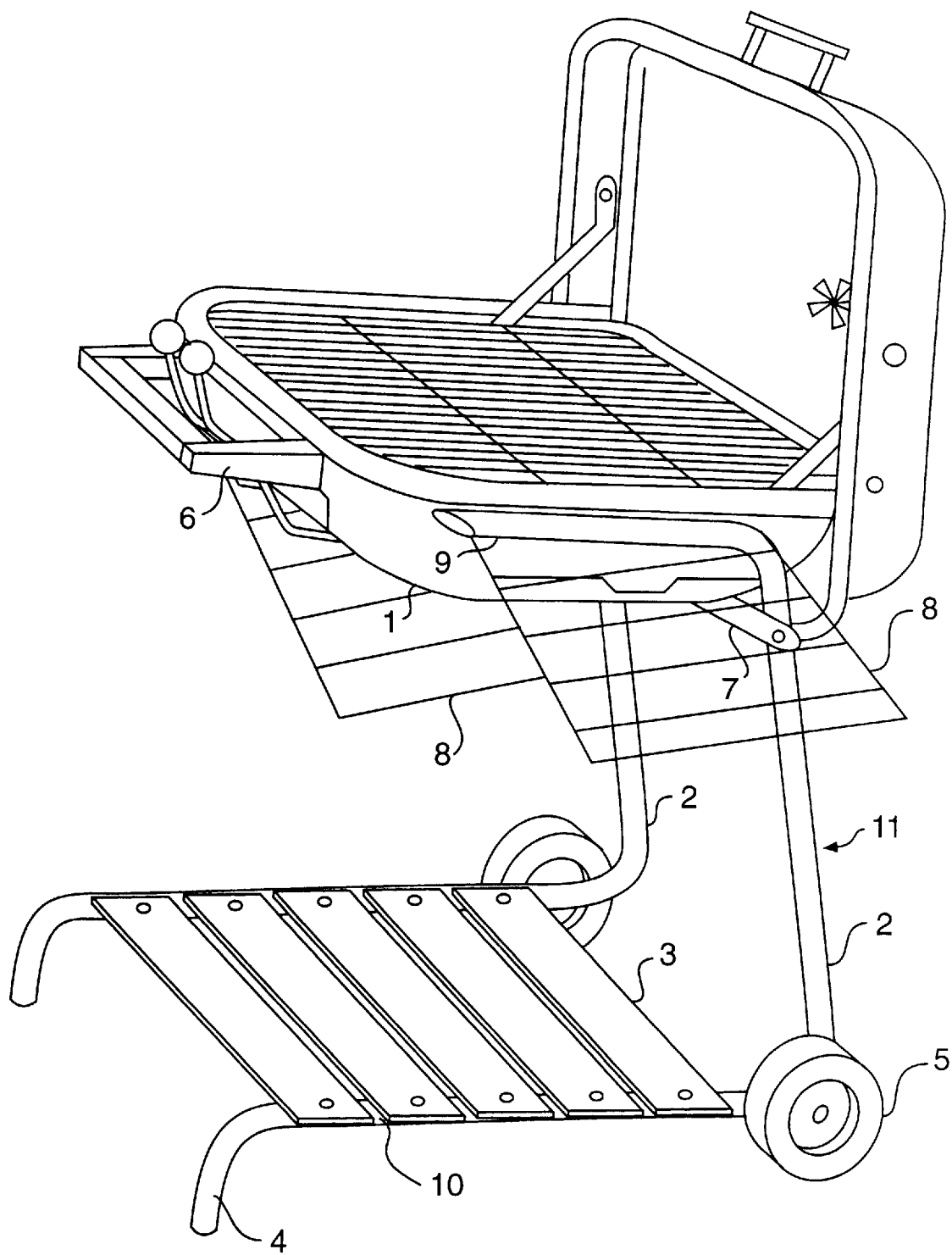
FIG. 1 shows the barbecue support and storage system with the barbecue grill in the open position.

Referring to FIG. 1 the free standing BSSFS with a barbecue grill cover in an open position is shown. The barbecue grill 1, which in this example is square, can be any shape known in the art (e.g., kettle, square, rectangle, etc.). The frame 2 comprises two generally "c-shaped" elements, each having a center portion 11, an upper support 9, and a lower leg 10. The two c-shaped elements are positioned parallel to one another so that the center portions 11 and opposite upper supports 9 and lower legs 10 of each c-shaped element are equally spaced from each other. The upper supports 9 and the lower legs 10 are connected by a cross bar 7 which acts to maintain the space between the c-shaped elements. The upper supports 9 of the c-shaped element of the frame 2 are preferably (but not necessary) a shorter length than the lower legs 10. However, depending on the barbecue grill 1 used, the upper supports 9 and lower legs 10 may vary in size. Further still, it is preferred that the upper supports 9 of the frame 2 be offset in the forward direction towards the front of the barbecue grill 1 from the center portion 11 of the frame 2 of each c-shaped member. The offset nature of the legs of the frame 2 allows for the upper support 9 of the frame 2 to be a shorter length than the lower legs 10 of the frame 2, supporting the barbecue grill in a cantilever fashion while the entire frame remains stable.

This configuration also permits the barbecue grill 1 and frame 2 to be securely balanced (so the assembly does not tip over from the weight of the grill 1). This arrangement also allows for easy transport when pushing/pulling the barbecue grill 1 to another location. The c-shaped elements may be hollow or solid and have any cross-sectional shape. For example, the elements may be generally oval in cross-section for added strength. The frame 2 is designed to be free standing and self-supporting, and is sturdy enough to withstand all weather conditions and other external forces. The frame 2 is constructed from a light weight alloy that is impenetrable to the elements.

The barbecue grill 1 is fixedly mounted to the upper supports 9 of the frame 2. The barbecue grill 1 may be bolted or otherwise be removably attached to the upper supports 9 for easy assembly and disassembly. The barbecue grill 1 may have a lip around the periphery so as to accommodate the upper supports 9 of the frame 2. First shelves 8 may be mounted to one or both upper supports 9 of frame 2. The shelves 8 may comprise at least one board attached to the upper supports 9 in a fixed manner, or by a hinge. The shelves 8 can be easily adjusted so that they are either in a downward position or in an horizontal position.

A second shelf 3 which in the preferred embodiment comprises one or more boards (members) is fixedly mounted on the lower legs 10 of the frame 2. Because the shelf 3 is positioned on the lower legs 10 of the frame 2, the lower legs 10 do not interfere with any items that are placed on the shelf 3 For example, oversized items exceeding the width and depth of the frame 2 may be placed on the shelf 3 without any impediments. The shelf 3 is typically adapted for use in the storage of food and barbecue accessories, but may be used for any purposes. The shelf 3 also adds to the structural integrity of the frame 2, assisting the cross bar 7 in keeping the frame 2 stable and the c-shaped elements parallel. The overall design of the frame 2 and use of sturdy components in constructing the frame assure that it will withstand external forces and will easily support the barbecue grill 1 and any other items stored on the shelves 3 and 8. Shelves 3 and 8 may be mounted at many locations on the frame 2 using configurations of boards, planks, or slats (or other members) and using cantilever support members at various intervals and spacings including locations and configurations other than those previously disclosed. Further several shelves can be stacked on top of one another, or mounted on the sides of the frame 2 in other configurations.

Extending substantially outward and downward from the ends of the lower legs 10 of the frame 2 is at least one extension 4 on each c-shaped member. The extension 4 is used to balance the frame 2 and barbecue grill 1 and is adapted to prevent the barbecue grill 1 from moving while in use. Located at a juncture between the lower leg 10 and center portion 11 of the frame 2 is at least one wheel 5 mounted on each c-shaped element. The wheels 5 are mounted to the frame such that the wheels are collinearly aligned, allowing the frame 2 and the barbecue grill 1 to be rolled on the wheels 5. To roll the frame 2 and the barbecue grill 1 on the wheels 5, the entire assembly is tilted back onto the wheels 5. Tilting the assembly disengages the extensions 4 from contact with the ground, allowing movement of the assembly. Because the center portions 11 of the c-shaped elements which support the weight of the barbecue grill 1 are displaced toward the back of the barbecue grill 1 and substantially over the wheels 5, the assembly is easy to tilt and move. While the wheels 5 are shown as individually mounted on separate axles, it is also contemplated that an axle may be mounted between the wheels 5. The wheel's 5 radius and extension 4 are of substantially the same length so as to allow the barbecue grill 1 and the shelves 3 and 8 to sit in a plane substantially parallel to the around.

As mentioned previously, near the juncture between the upper support 9 and the center portion 11 is a cross bar 7 mounted thereto. The cross bar 7 is provided for added stability, to maintain the spacing between the c-shaped elements, and to add strength of the frame 2 and can be used to support a shelf if desired. The cross bar 7, in conjunction with the frame 2, may also be used to prevent the lid of the barbecue grill 1 from overextending itself in the open position when any such lid has no other restraints. The cross bar 7 can be placed at any location of the center portion of the frame 2 and multiple cross bars may be used and are contemplated by the present invention.

At least one handle 6 is located on the front of the barbecue grill 1 so that the user may push or pull the assembly from one destination to another. The handle 6 may also be mounted to the frame 2 on the back side of the grill 1 In an alternate embodiment the handle 6 may be extended outward from the ends of the upper supports 9 or the center portion 11 of frame 2. When the handle 6 is extended outward from the upper supports 9 or center portion 11 of the frame 2, the assembly may be maneuvered in any direction.

Figure 2:
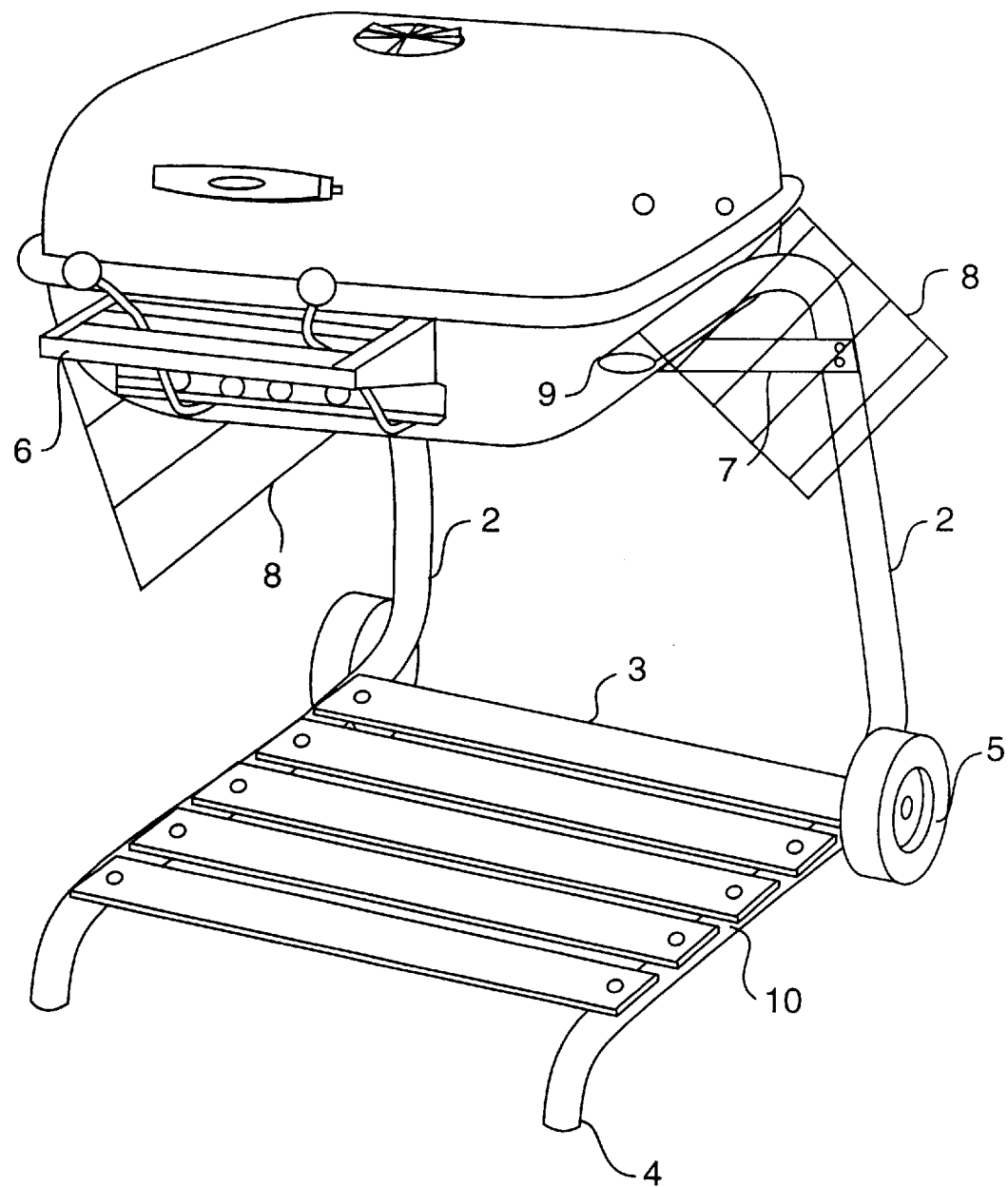
FIG. 2 shows the barbecue support and storage system with the barbecue grill in the closed position.

FIG. 2 shows the barbecue grill 1 in a closed position. FIG. 2 also depicts the barbecue grill with the side shelves 8 in the lower position. As mentioned previously, the shelves 3 and 8 may be mounted at other locations of the frame 2 using other configurations of boards, planks, slats, or other materials (or members) at different intervals and spacing depending on the specific application of the grill assembly. The shelves 8 are optional and do not affect the stability of the barbecue support frame.

It can be seen from the above embodiments that the grill assembly is designed to be a free standing and self-supporting system that can withstand several external stimuli including weather conditions and external loads. The frame 1 can be easily assembled and disassembled due to its simple design and will allow for easy transport from one location to another. Due to the simple design of the above embodiments, the BSSFS can be manufactured at a low cost.

Figure 3:
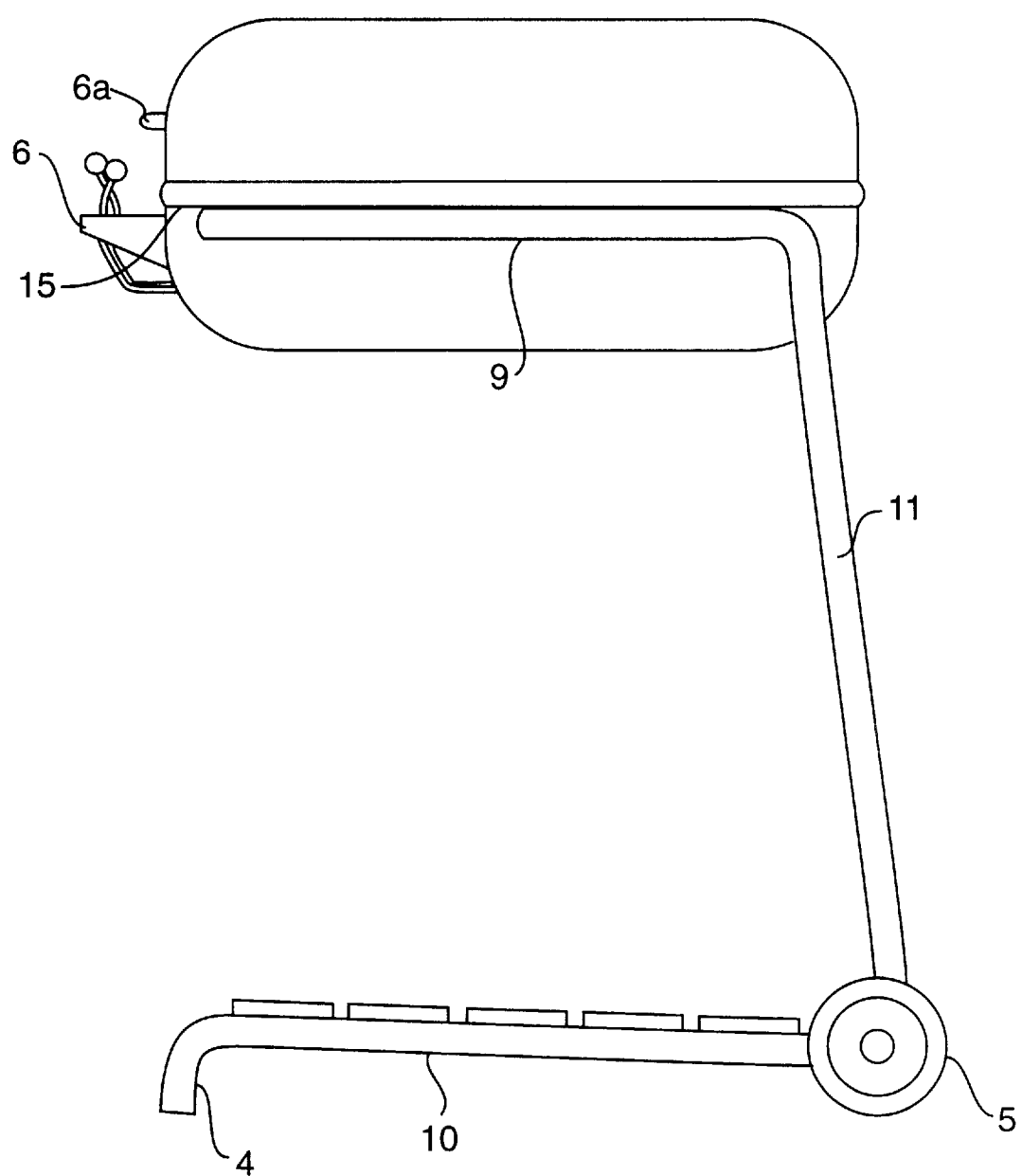
FIG. 3 shows a side view of the barbecue support and storage system with the barbecue grill in the closed position.

FIG. 3 shows a side view of the BSSFS when the barbecue grill is in a closed position. As seen, at the juncture between the center portion 11 and the lower leg 10 is a wheel 5. In the preferred embodiment, the wheel 5 is placed on both sides of the barbecue unit. Extending outward and downward from the lower leg 10 is the extension 4. It is preferred that the extension 4 be located on both sides of the barbecue unit to offset the effects of the wheels 5, thereby providing a means to prevent the barbecue unit from moving when in use. The upper support 9 is located below a lip 15 on the barbecue grill. The lip 15 is provided about the periphery of the barbecue grill. The handle 6 located on the barbecue grill 2 is also shown.

It should be noted that the lip 15 is not part of the storage frame and therefore is not required for the functioning of the present invention handle 6 may or may not comprise a part of the present BSSFS, depending on whether the handle is attached an upper support 9, or to the barbecue grill unit itself. For example, if no lip is present on the barbecue unit, the BSSFS may be fixedly attached to the barbecue by simply bolting or screwing the upper support to the sides of any desired barbecue unit. A handle may be attached to the barbecue grill.

Figure 4:
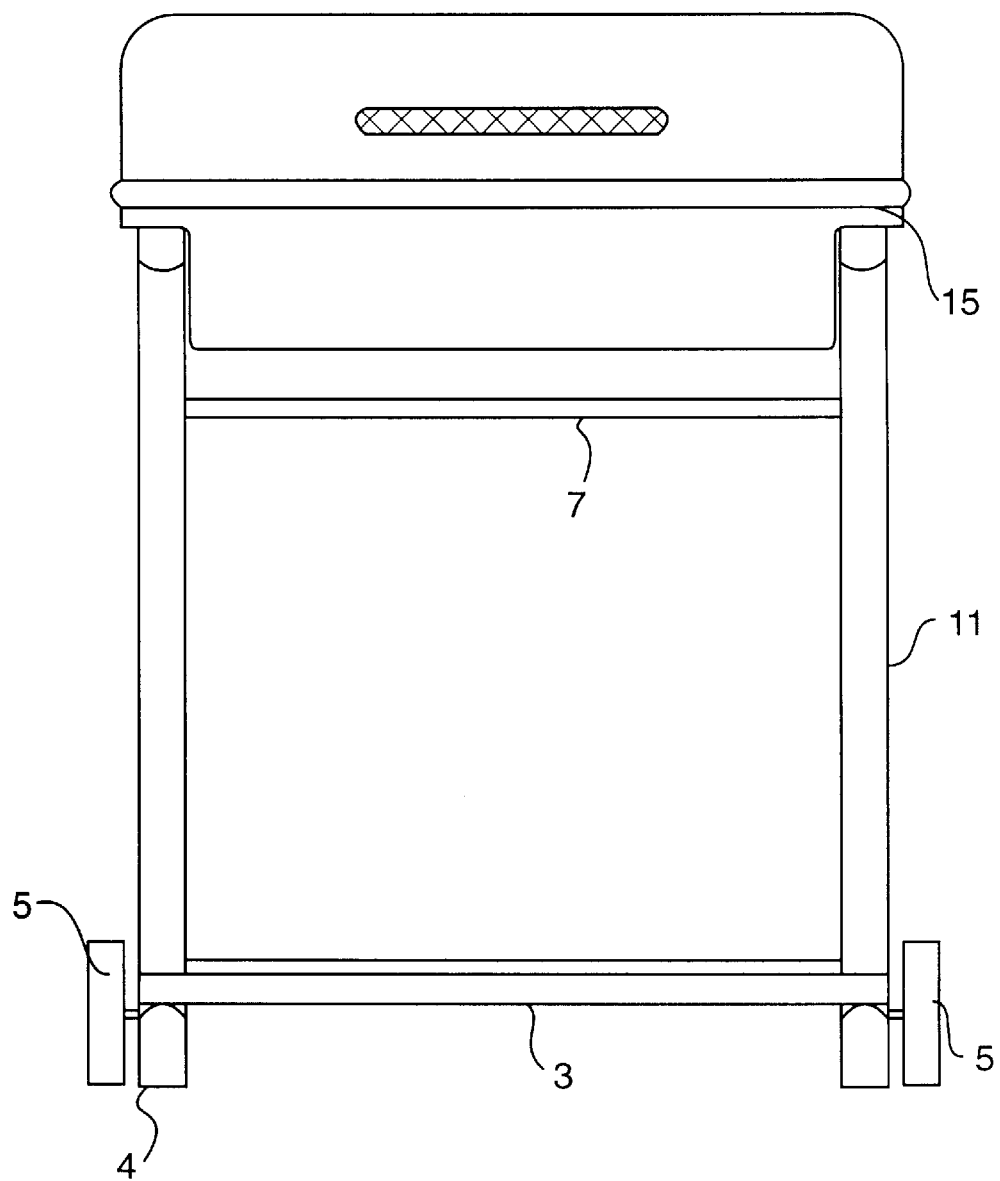
FIG. 4 shows a front view of the barbecue support and storage system with the barbecue grill in the closed position.

Referring to FIG. 4 a front view of the BSSFS is shown. The barbecue grill 1 is attached to the upper supports 9 of the c-shaped elements. The shelves 3 are placed on the lower legs 10 (not shown) The shelf 3 adds to strength to the frame 2 by assisting the cross bar 7 in keeping the frame 2 stable and maintaining the spacing of the c-shaped elements. Extending, downward from the lower legs 10 are the extensions 4. The extensions 4 extend downward and outward and contact the floor. The extensions 4 balance the BSSFS so that it does not tip over. The extensions 4 also provide a means for preventing the barbecue grill 1 from moving while in use. The handle 6 located on the barbecue grill 1 is also shown. The handle 6 may also be located on the bottom portion of the barbecue grill 1.

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons skilled in the art.

We claim:

1. A barbecue support and storage frame with a front, comprising:
    a) A first generally c-shaped support, the first generally c-shaped support consisting of a first upper support with front and back ends, a first center portion with upper and lower ends, and a first lower leg with forward and rear ends, the first upper support comprising a cantilever, the first upper support cantilever being attached to a first side of a barbecue grill unit, wherein the back end of the first upper support is attached to the upper end of the first center portion, and the lower end of the first center portion is attached to the rear end of the first lower leg;
    b) a second generally c-shaped support, the second generally c-shaped being spaced apart from the first generally c-shaped support, the second generally c-shaped support consisting of a second upper support with front and back ends, a second center portion with upper and lower ends, and a second lower leg with forward and rear ends, the second upper support comprising a cantilever, the second upper support cantilever being attached to a second side of the barbecue grill unit, wherein the back end of the second upper support is attached to the upper end of the second center portion, and the lower end of the first center portion is attached to the rear end of the second lower leg; and
    c) at least one cross bar, the cross bar having a first end and a second end, the first end of the cross bar being fixed to the center portion of the first generally c-shaped support and the second end of the cross bar being fixed to the second center portion of the second generally c-shaped support.

2. The barbecue support and storage frame of claim 1, wherein die first and second generally c-shaped supports are bolted respectively to the first and second sides of the barbecue unit.

3. The barbecue support and storage frame of claim 1, wherein the first and second generally c-shaped supports are screwed respectively to the first and second sides of the barbecue unit.

4. The barbecue support and storage frame of claim 1, wherein the first lower leg of the first generally c-shaped support is substantially parallel to the cantilever of the first upper support, and the second lower leg of the second generally c-shaped support is substantially parallel to the cantilever of the second upper support.

5. The barbecue support and storage frame of claim 1 further comprising a first downward extension projecting downward and forward from the forward end of the first lower leg of the first generally c-shaped support and a second downward extension projecting downward and forward from the forward end of the second lower leg of the second generally c-shaped support.

6. The barbecue support and storage frame of claim 1 further comprising at least one shelf attached to the first and second lower legs.

7. The barbecue support and storage frame of claim 6 wherein the shelf comprises one or more members.

8. The barbecue support and storage frame of claim 1, further comprising at least one shelf mounted to the cantilever of the first upper support, and at least one shelf mounted to the cantilever of the second upper support.

9. The barbecue support and storage frame of claim 8, wherein each at least one shelf is hinge mounted, and further comprises at least one member.

10. The barbecue support and storage frame of claim 1, further comprising at least a shelf mounted to the cantilever of the second upper support.

11. The barbecue support and storage frame of claim 10, wherein the shelf is hinge mounted, and further comprises at least one member.

12. The barbecue support and storage frame of claim 1, further comprising two wheels, one wheel mounted on the rear ends of each of the first and second lower legs.

13. The barbecue support and storage frame of claim 1, wherein the cantilever of the first upper support is offset toward the front of the barbecue support and storage frame, and the cantilever of the second upper support is offset toward the front of the barbecue support and storage frame.

14. The barbecue support and storage frame of claim 1, wherein the generally c-shaped supports have a cross section that is generally circular.

15. The barbecue support and Storage frame of claim 1, wherein the generally c-shaped supports have a cross section that is generally oval.

16. The barbecue support and storage frame of claim 1, wherein the generally c-shaped supports have a cross section that is generally square.

17. The barbecue support and storage frame of claim 1, wherein the generally c-shaped supports have a cross section that is generally square.

18. The barbecue support and storage frame of claims 14, 15, 16 or 17, in which the generally c-shaped supports are hollow.

19. The barbecue support and storage frame of claims 14, 15, 16 or 17, in which the c-shaped supports are solid.

20. A method for supporting a barbecue grill unit with first and second sides and a front comprising:
    a) supporting the barbecue grill unit with a first and a second cantilever support, wherein the first cantilever support consists of a first vertical support with upper and lower ends and a first upper support that is positioned generally horizontally and attached to the upper end of the first vertical support, and the second cantilever support consists of a second vertical support with upper and lower end and a second upper support that is positioned generally horizontally and attached to the upper end of the second vertical support; and
    b) stabilizing the barbecue grill unit by providing a support member with first and second ends, wherein the first end is attached to the first cantilever support, and the second end is attached to the second cantilever support.

21. A method of supporting a barbecue grill unit of claim 20, further comprising attaching the first cantilever support to the first side of the barbecue grill unit, and attaching the second cantilever support to the second side of the barbecue grill unit.

22. A method of supporting a barbecue grill unit of claim 20, wherein the first and second cantilevers are offset toward the front of the barbecue unit.

23. A method of supporting a barbecue grill unit of claim 20 by providing a first lower leg that is parallel to the first upper support and attached to the lower end of the first vertical support, and providing a second lower leg that is parallel to the second upper support and attached to the lower end of the second vertical support.

24. A method of supporting a barbecue grill unit of claim 23 by providing at least one shelf attached to and between the first lower leg and the second lower leg.

25. A method of supporting a barbecue grill unit of claim 20 by providing a center of gravity wherein the moment forces associated with the barbecue grill unit are substantially equal to zero.

26. A method of supporting a barbecue grill unit of claim 20 by providing at least one downward extension from each lower leg to balance the barbecue grill unit and to prevent the barbecue grill unit from moving while in use.

* * * * *